United States Patent
Adcock (10) Patent No.: US 7,322,388 B2
(45) Date of Patent: Jan. 29, 2008

(54) TREE REMOVAL ATTACHMENT AND METHOD

(76) Inventor: Jimmy L. Adcock, 6726 Branson Mill Rd., Pleasant Garden, NC (US) 27313

( * ) Notice: Subject to any disclaimer, the term of this patent is extended or adjusted under 35 U.S.C. 154(b) by 0 days.

(21) Appl. No.: 11/047,806

(22) Filed: Feb. 1, 2005

(65) Prior Publication Data

US 2006/0169358 A1    Aug. 3, 2006

(51) Int. Cl.
*A01G 23/089* (2006.01)
(52) U.S. Cl. .................... 144/34.1; 144/24.12
(58) Field of Classification Search ........ 144/334–336, 144/339, 4.1, 34.1, 34.2, 34.5, 24.12; 37/302; 56/10.1, 14.7, 16.7, 15.1, 15.5, 15.9; 30/228
See application file for complete search history.

(56) References Cited

U.S. PATENT DOCUMENTS

| | | | | |
|---|---|---|---|---|
| 2,865,116 A | * | 12/1958 | Messer | 37/302 |
| 3,822,730 A | * | 7/1974 | Hultdin et al. | 144/34.1 |
| 4,273,169 A | * | 6/1981 | Baenen | 144/34.1 |
| 4,802,517 A | * | 2/1989 | Laster | 144/34.5 |
| 4,913,203 A | * | 4/1990 | Lessard | 144/34.5 |
| 6,202,719 B1 | * | 3/2001 | Ketonen | 144/24.13 |
| 6,374,877 B1 | * | 4/2002 | Wildey | 144/4.1 |
| 6,662,836 B1 | * | 12/2003 | Andersen | 144/34.5 |

* cited by examiner

*Primary Examiner*—Shelley M. Self (57) ABSTRACT

A tree removal attachment is provided which can be easily affixed to construction equipment such as a small loader or skidster. The tree removal attachment has at least one moveable blade which is powered preferably by the hydraulic system of the loader for use in tree removal. The tree removal attachment replaces a bucket or other loader equipment and can be operated in relatively small, confined areas. The method of use prevents the necessity of backfilling a large hole as usually formed by bulldozers as they extract the roots attached to a tree trunk during removal from the ground. The tree removal attachment can be adapted to work on various heavy equipment such as skidsters, bobcats, track-hoes, excavators, back-hoes, bulldozers, tractors, truck loaders, forklifts, cranes and other heavy equipment.

9 Claims, 10 Drawing Sheets

TREE REMOVAL ATTACHMENT AND METHOD

FIELD OF THE INVENTION

The invention herein pertains to a tree removal attachment for use with earth moving equipment, farm equipment and heavy construction equipment, and particularly pertains to a tree removal attachment having cutting blades to sever tree roots below ground thus allowing for removal of the tree.

DESCRIPTION OF THE PRIOR ART AND OBJECTIVES OF THE INVENTION

Recent years have witnessed an increase in the number and types of small loaders used in construction and other industries. These loaders are known under a variety of names such as skidsters, bobcats, utility loaders among others. These loaders generally have two (2) pairs of wheels although some small loaders utilize endless tracks. Various conventional attachments include pallet forks, front buckets, grapples, post-hole diggers and others. Such equipment is generally affixed to the side arms or booms of the loader and manipulated using hydraulic power.

Tree removal is an important part of construction and is also desired and at times necessary in landscaping and land restoration after hurricanes and other storms. While large bulldozers can be used in large construction projects, this type of equipment is often unsatisfactory in restricted areas such as yards, between closely adjacent buildings and in other confined areas when tree removal is needed. While small loaders can be easily maneuvered in restricted spaces, their power is not usually adequate to push trees down as when using powerful bulldozers. Additionally, it is not desirable to spend time backfilling holes and uneven terrain such as required when large bulldozers are used.

Thus, based on the problems and disadvantages of conventional tree removal equipment, the present invention was conceived and one of its objectives is to provide a tree removal attachment for use on small loaders and other earth moving, farm and construction equipment.

It is another objective of the present invention to provide a tree removal attachment which can be quickly and easily affixed to or removed from the loader or other equipment being used.

It is still another objective of the present invention to provide a tree removal attachment which will use the power system available on the selected loader or equipment being used such as a hydraulic system.

It is yet a further objective of the present invention to provide a method for tree removal that removes the entire tree to include the tree base or stump and roots with minimal soil removal with the afore described tree removal attachment.

It is still another objective of the present invention to provide a tree removal attachment which can be used in restricted spaces such as between closely adjacent buildings when working beside an adjacent building.

Various other objectives and advantages of the present invention will become apparent to those skilled in the art as a more detailed description is set forth below.

SUMMARY OF THE INVENTION

The aforesaid and other objectives are realized by providing a tree removal attachment for use with typical construction or heavy equipment such as skidsters, bobcats, front-end loaders and other "loaders" which can be easily maneuvered in tight, confined spaces. Upon being attached to a loader and through manipulation of the foot pedals, joysticks, or levers as conventionally associated therewith, the tree removal attachment can be maneuvered to various positions such as from parallel to perpendicular with the ground or to the right or left and includes a pair of hydraulically powered blades which can be used for severing tree roots, branches, trunks and the like or to transport the same. The tree removal attachment includes an inverted U-shaped frame having a rear frame section releasably attached to the standard booms of the loader. A pair of blades acting in a scissors like fashion is hydraulically controlled to cut and grasp tree stumps, roots and the like. The blades are mounted on the front section of the inverted U-shaped frame.

DETAILED DESCRIPTION OF THE PREFERRED EMBODIMENT AND OPERATION OF THE INVENTION

Figure 1:
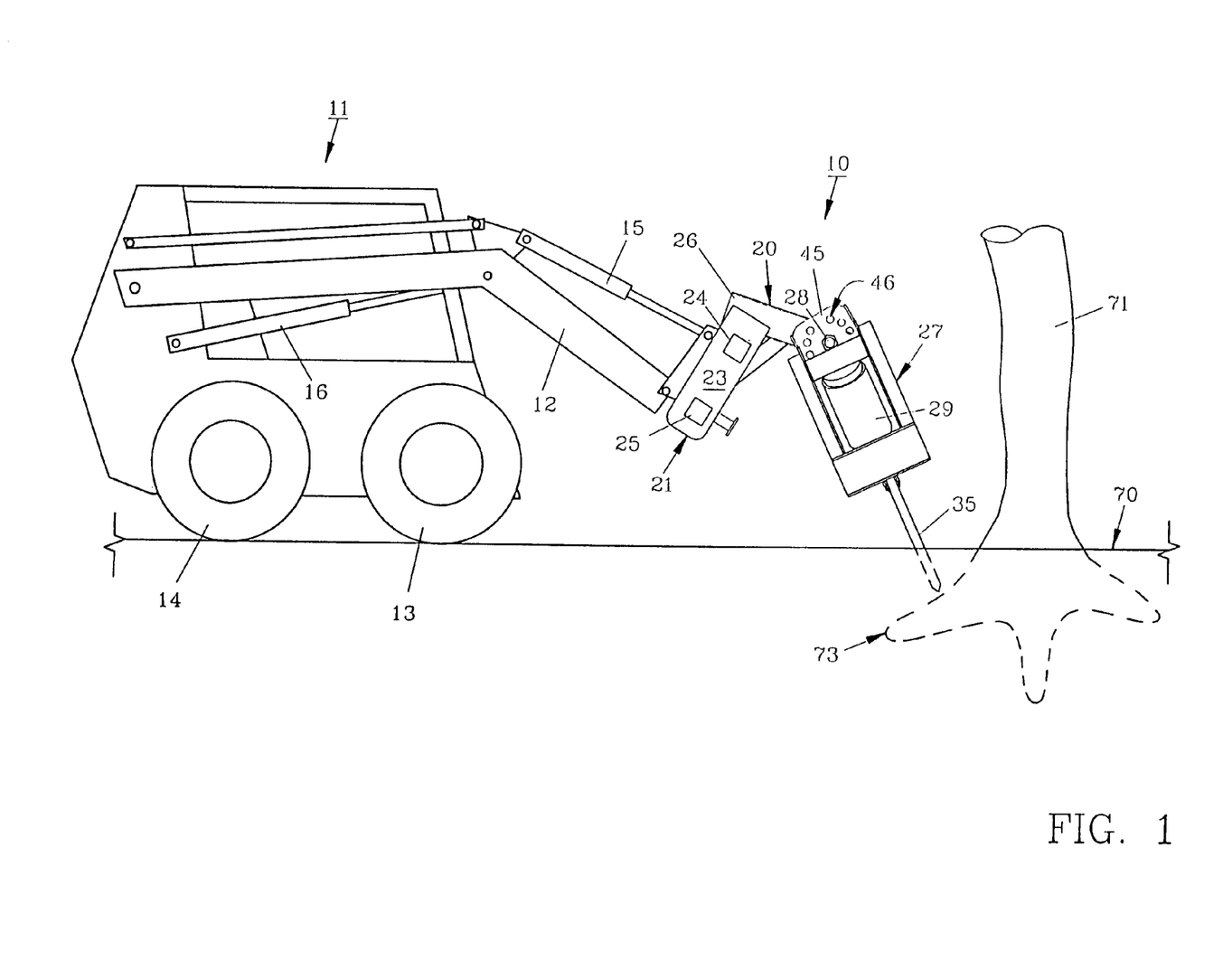
FIG. 1 shows an elevational view of the tree removal attachment as attached to heavy equipment ready to sever the roots of a tree for removal.

For a better understanding of the invention and its operation, turning now to the drawings, preferred tree removal attachment 10 is shown in FIG. 1 affixed to utility or heavy equipment such as loader 11. Loader 11 is used generally in construction and land clearing operations and is sold under various brand names such as a "skidster, bobcat, front-end loader" and otherwise. Loader 11 includes a pair of front wheels 13 and a pair of rear wheels 14 however other similar equipment use tracks. Loader 11 includes left boom 12 (FIG. 1) and right boom 12' (FIG. 2) which are hydraulically operated as is conventional in the trade with hydraulic cylinders 15, 16 (FIG. 1), and 15', 16' (FIG. 2) respectively along the sides thereof. The hydraulic system to power loader booms 12, 12' and releasably attached tree removal attachment 10 is not shown as such is conventional and well known in the trade. Although not shown, loader 11 can be used with various types of standard equipment such as buckets, post hole diggers, snow blades and the like. In FIG. 1, loader 11 is shown with tree removal attachment 10 penetrating ground 70 to sever roots 73 of tree 71.

Figure 2:
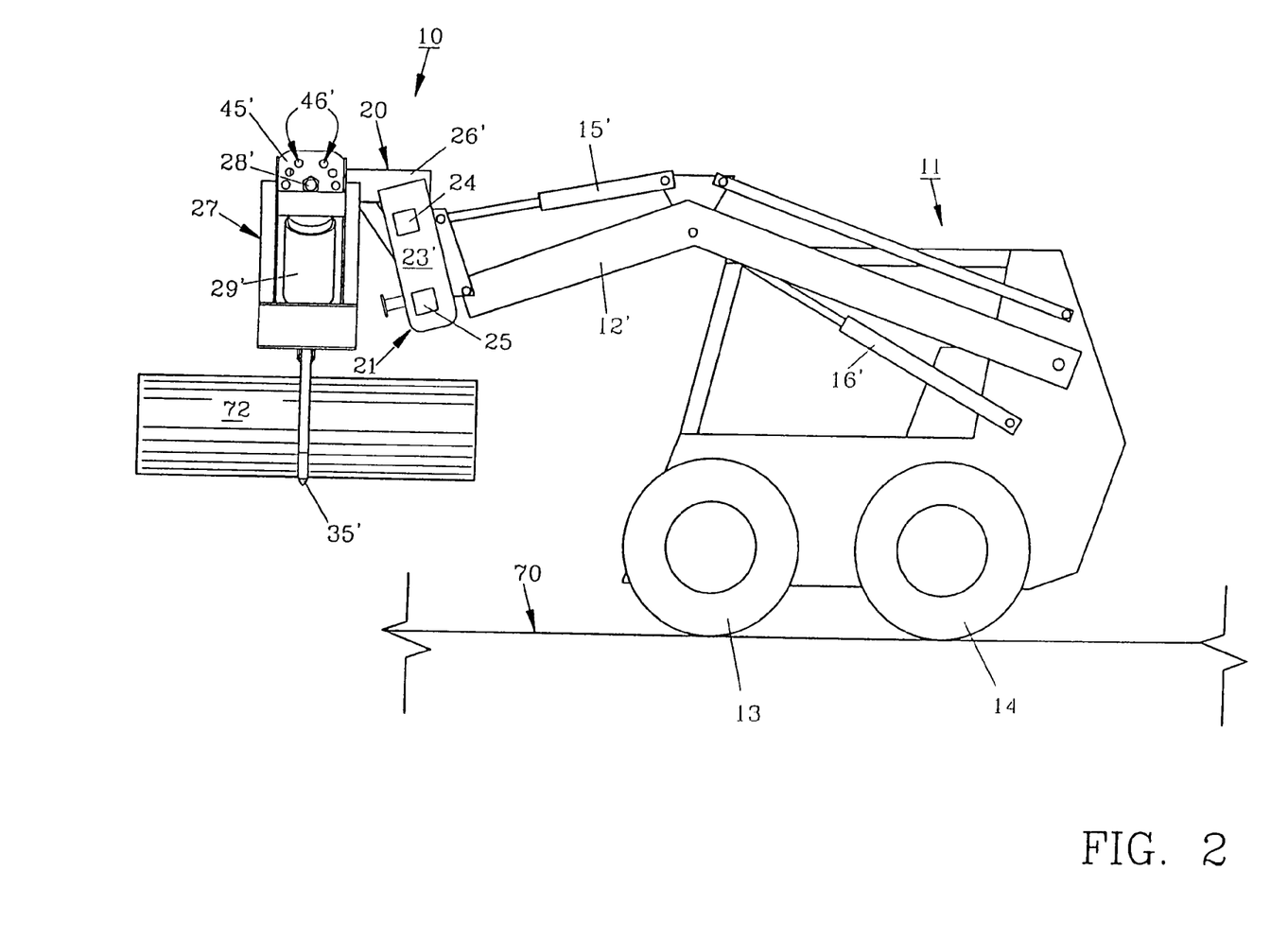
FIG. 2 shows an elevational view of the tree removal attachment as attached to heavy equipment and with a tree section held therein.
Figure 3:
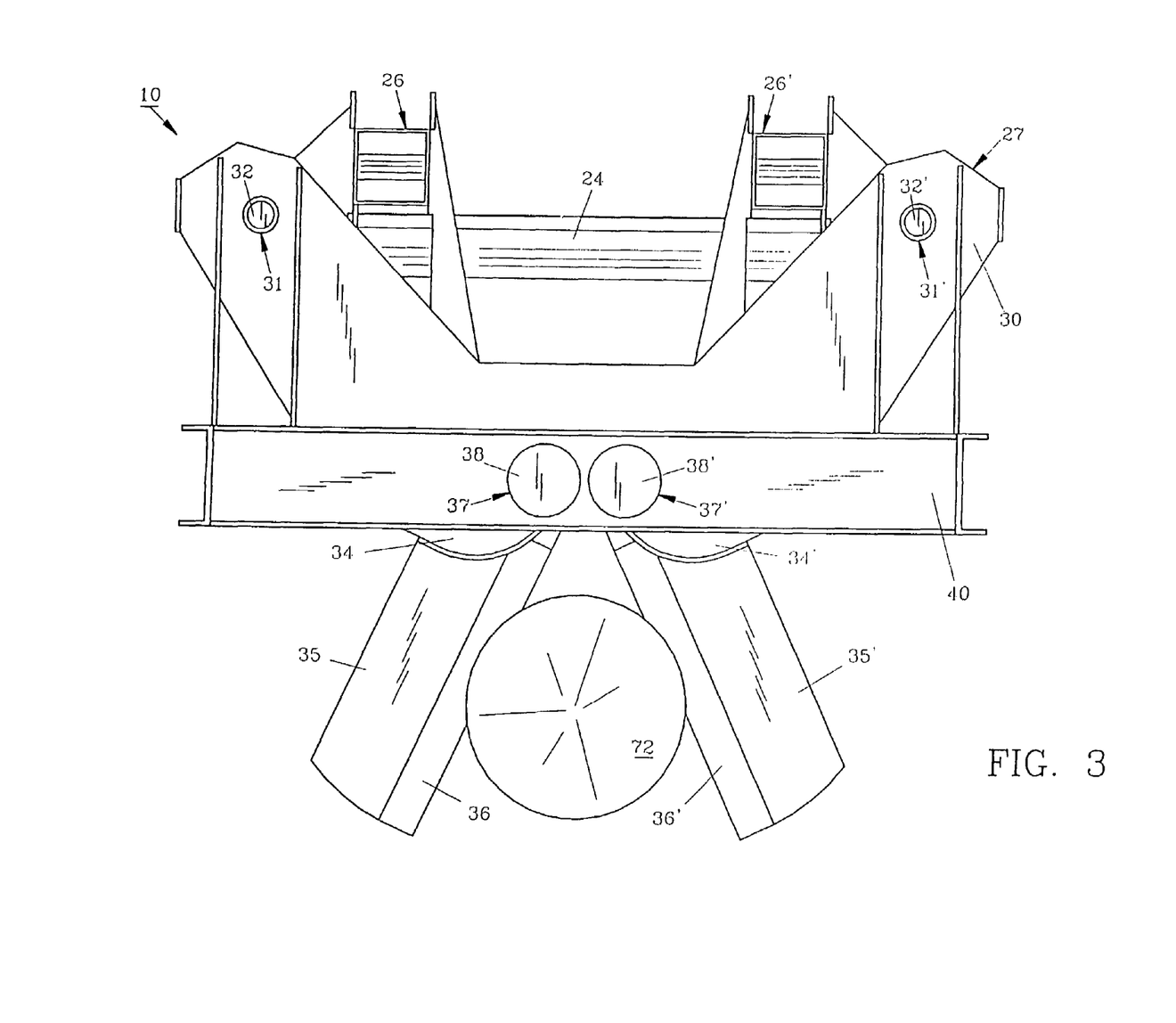
FIG. 3 shows a front elevational view of the tree removal attachment with the blades open and a tree section held therein.
Figure 7:
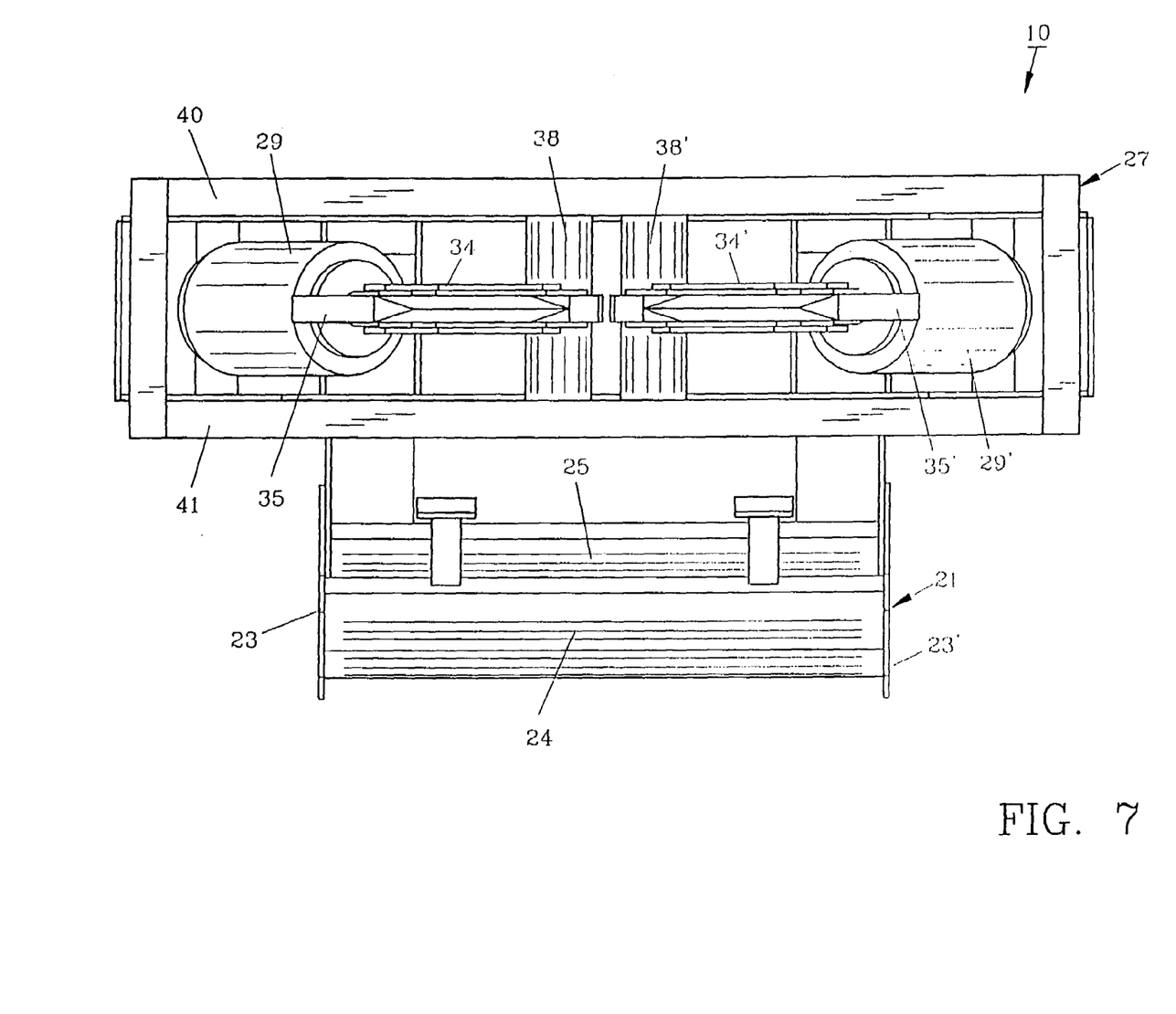
FIG. 7 shows a bottom plan view of the tree removal attachment as seen in FIG. 3 without the tree section.
Figure 8:
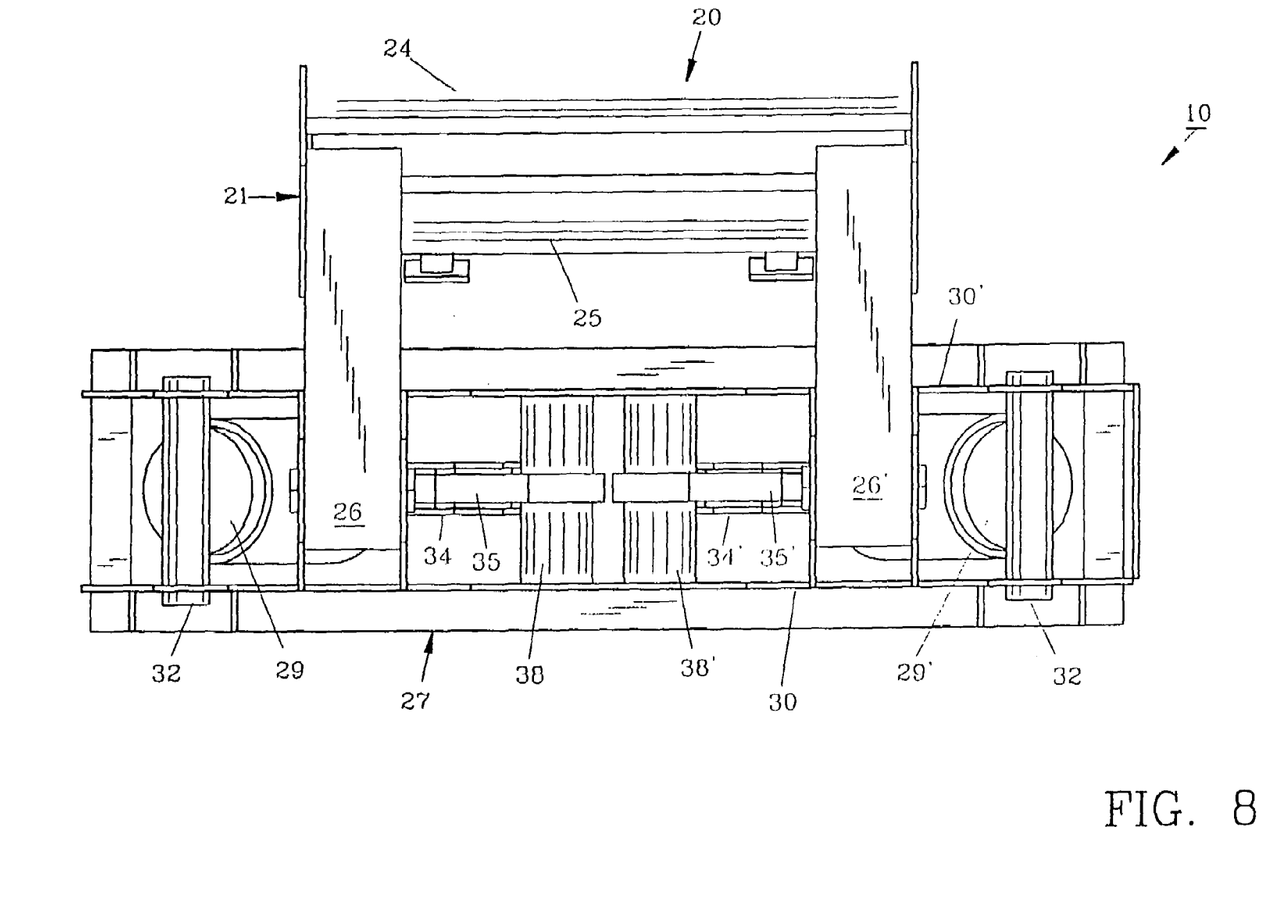
FIG. 8 shows a top plan view of the tree removal attachment as seen in FIG. 7.

In FIG. 2, loader 11 is shown with tree removal attachment 10 grasping tree trunk section 72 such as to cut or transport the same. As seen from the left and right sides in FIGS. 1 and 2, tree removal attachment 10 includes inverted U-shaped mounting frame 20 preferably formed from welded steel box tubes, plates and other shaped components having middle frame extensions 26, 26' attached between rear section 21 and front section 27 depending therefrom. As shown in FIGS. 1 and 2, rear frame section 21 releasably secures tree removal attachment 10 to loader 11 by conventionally engaging booms 12, 12' as is customary for equipment attached. Rear frame section 21 is preferably rigidly affixed to middle frame extensions 26, 26' and includes left side member 23 and right side member 23' (FIGS. 6 and 7) having upper and lower support members 24, 25 rigidly affixed by welding the same therebetween as seen in FIGS. 6, 7 and 8.

Figure 4:
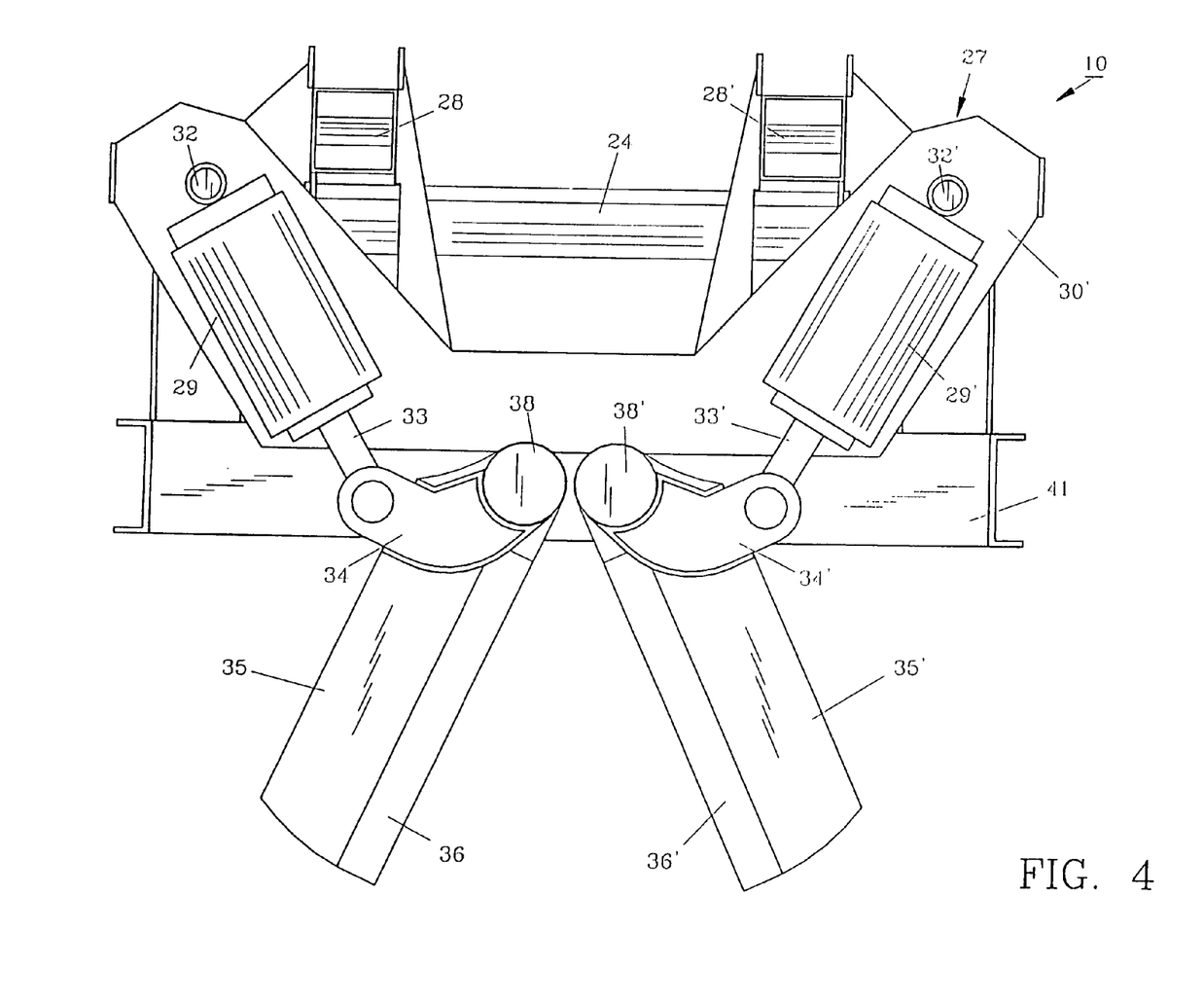
FIG. 4 shows the tree removal attachment as seen in FIG. 3 having parts removed for clarity purposes and without the tree section.
Figure 5:
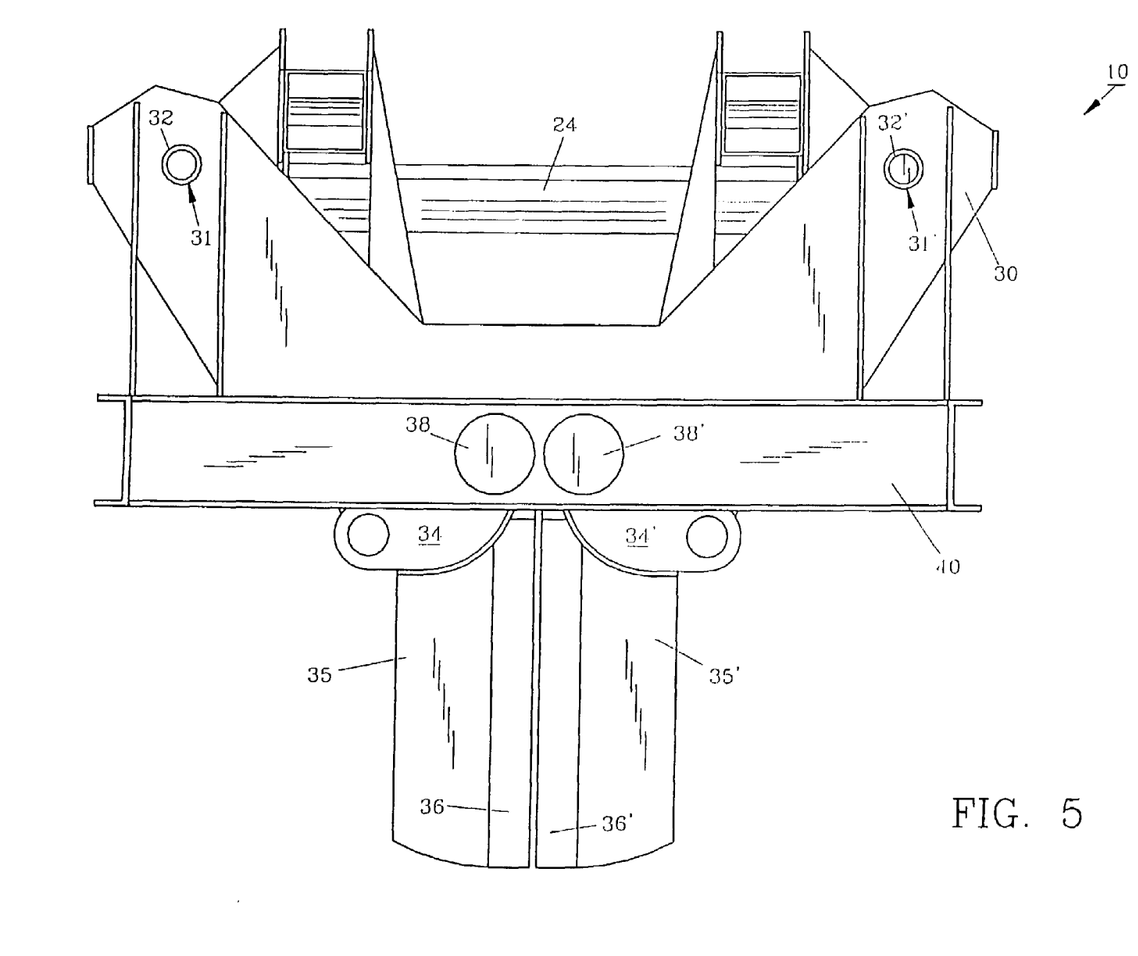
FIG. 5 shows the tree removal attachment as seen in FIG. 3 with the tree section removed and the blades closed.
Figure 6:
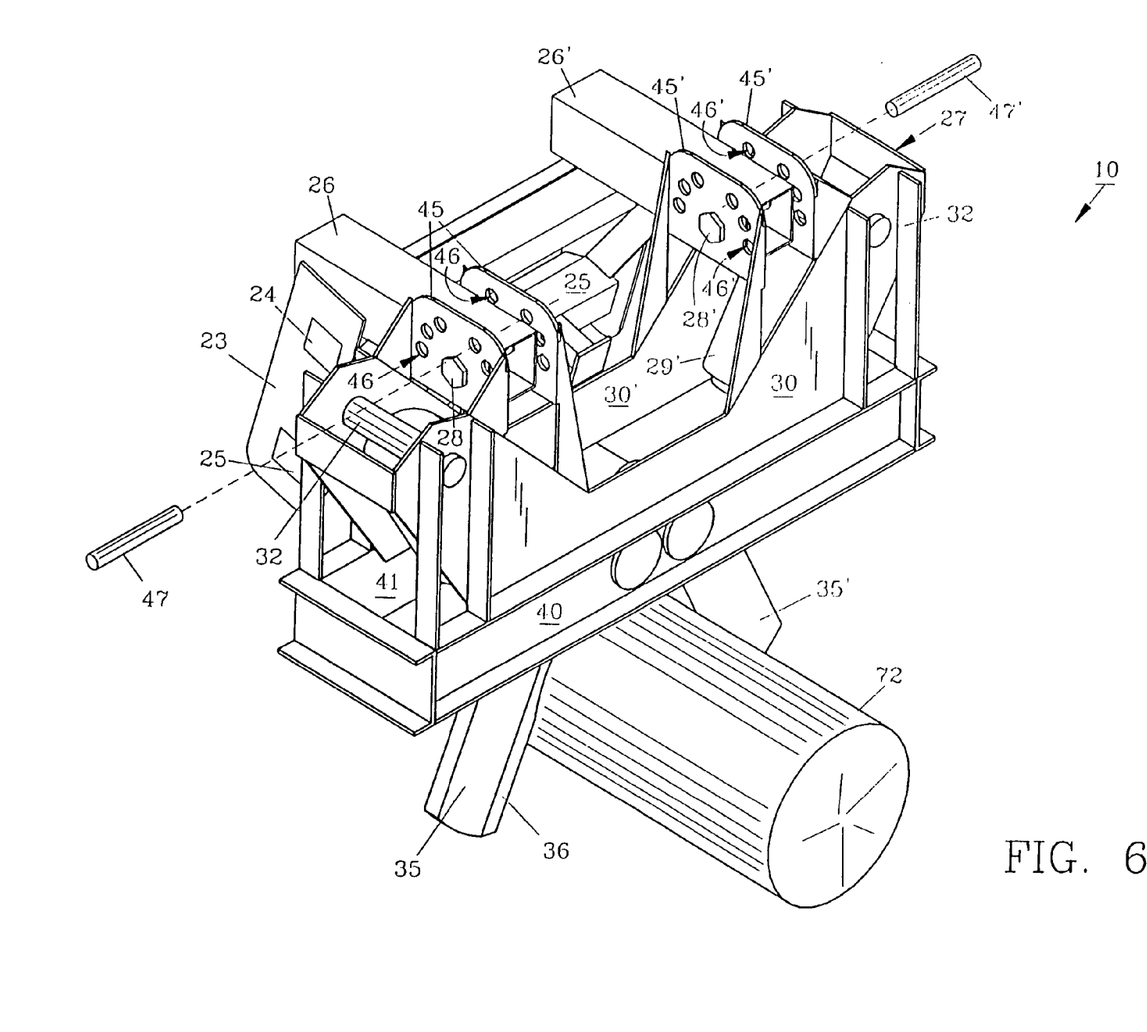
FIG. 6 shows a left front perspective view of the tree removal attachment with the tree section held therein.

As seen in FIGS. 4 and 6, front frame section 27 contains blades 35, 35' mounted thereon and includes (2) pairs of mounting brackets 45, 45' with axle bores (not shown) that receive therebetween middle frame extensions 26, 26' having axle apertures (not shown) in the sides thereof and in axial alignment with the axle bores (not shown). Pivot axles 28, 28' are contained in the axle bores (not shown) and releasably affixed to mounting brackets 45, 45' while rotationally received in the axle apertures and extending beyond the same transversely through middle frame extensions 26, 26' therebetween. By effecting rotation of pivot axles 28, 28' within middle frame extensions 26, 26', blades 35, 35' may be positioned as required at various angles in relation to ground 70. Pivot axles 28, 28' may be removed from front frame section 27 and middle frame extensions 26, 26' to separate, service and replace the same.

Additionally, FIG. 6 shows mounting brackets 45, 45' which include a plurality of paired locking channels 46, 46' which are arranged about pivot axles 28, 28' respectively and in axial alignment therewith while straddling middle frame extensions 26, 26'. Locking channels 46, 46' receive one or more conventional locking pins 47, 47' (shown exploded from tree removal attachment 10 in FIG. 6) which engage middle frame extensions 26, 26' between mounting brackets 45, 45' respectively to restrict the range of rotational motion of front frame section 27 along pivot axles 28, 28'.

In FIG. 1, blades 35, 35' (35' not shown) are positioned at an angle of approximately sixty-five degrees (65°) with ground 70 whereas in FIG. 2, blades 35, 35' (35 not shown) are positioned at an angle approximately ninety degrees (90°) with ground 70 by pivoting front section 27 through pivot axles 28, 28'. Thus, the pivoting action of front section 27 is gravity influenced by the movement of booms 12, 12'. To set a desired angle for blades 35, 35', locking pins 47, 47' are manually inserted into locking channels 46, 46' as seen FIG. 6. An alternate embodiment contemplated for the tree removal attachment (not shown) comprises a conventional auxiliary hydraulic piston operated and hydraulically powered by loader 11 to automate locking and tilting of front frame section 27 as regularly done with conventional attachments. In an additional embodiment (not shown), mounting frame 20 is modified to accommodate mounting requirements of alternate loaders (not shown) including positioning front frame section 27 such that alternate pivot axles are axially aligned along the length of alternate loader rather than the width as in preferred tree removal attachment 10 and loader 11.

In FIGS. 3-6, tree removal attachment 10 includes preferably a pair of rigid steel blades 35, 35' having dual beveled cutting edges 36, 36' which is preferred. Although not shown but contemplated, alternate blades may have separate cutting edges that are removably affixed to the alternate blades to facilitate replacement and selective use of cutting edges having a particular hardness rating to coincide with the intended cutting environment. As further seen in FIG. 3, front section 27 of tree removal attachment 10 includes front V-plate 30 having a pair of support apertures 31, 31' receiving support rods 32, 32' therein and front bracket member 40 having apertures 37, 37' receiving blade shafts 38, 38' therein. In FIG. 4, front V-plate 30 and front bracket member 40 have been removed for clarity purposes whereby support rods 32, 32' are shown attached to conventional hydraulic cylinders 29, 29'. Respectively, hydraulic cylinders 29, 29' drive piston shafts 33, 33' which are pivotally attached to and operate blade connectors 34, 34'. Blade connectors 34, 34' are affixed to blades 35, 35' respectively and are preferably U-shaped to maintain and sandwich the same therebetween as seen in FIGS. 7 and 8 while rotationally mounted on blade shafts 38, 38' which extend through blade connector apertures (not shown). Blade shafts 38, 38' are attached to front bracket member 40 and rear bracket member 41 as shown in FIGS. 7 and 8 allowing blades 35, 35' to open or close for severing or gripping purposes when hydraulic cylinders 29, 29' are powered to effect movement of blade connectors 34, 34'.

Figure 9:
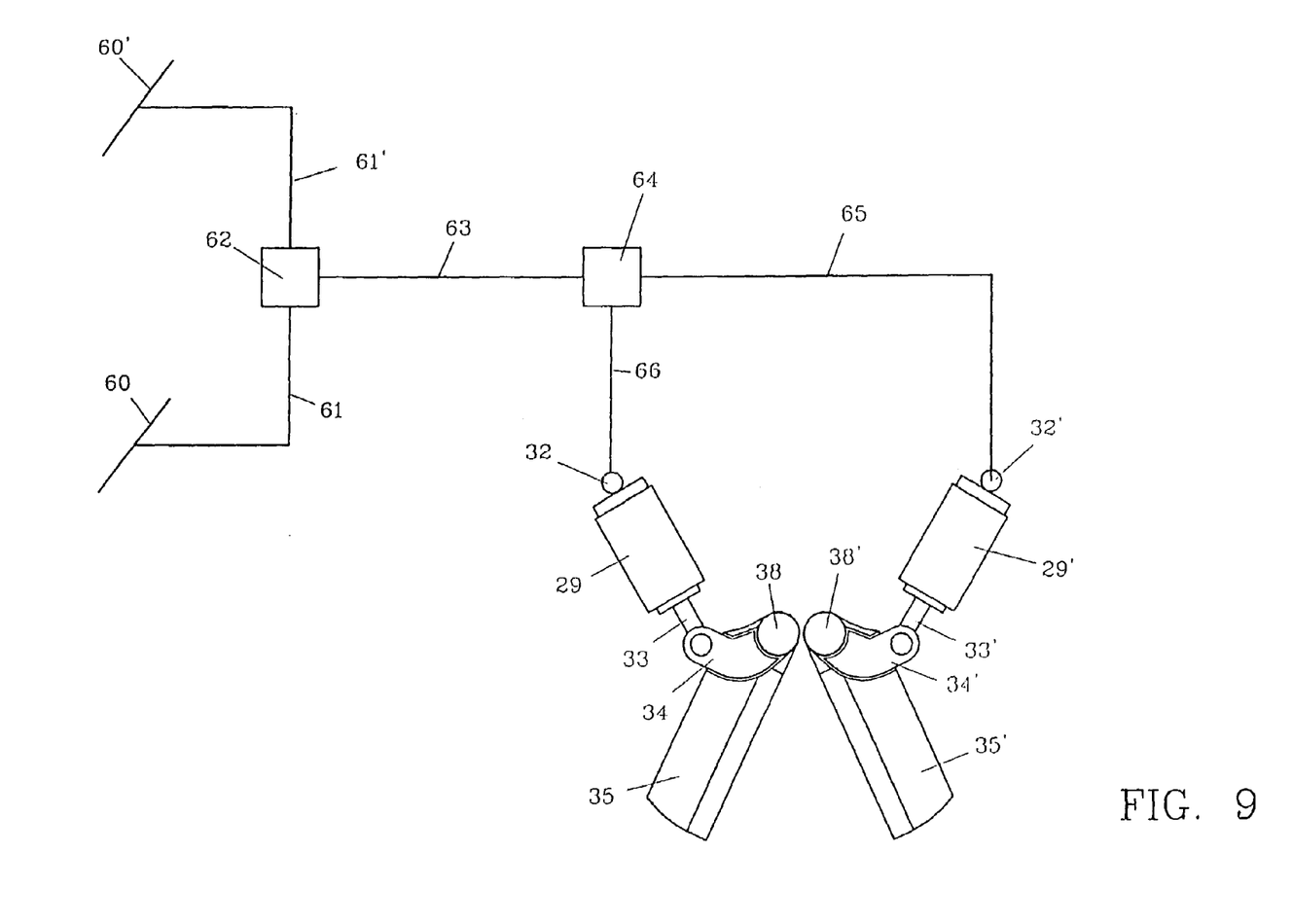
FIG. 9 illustrates a schematic view of the hydraulic system of the tree removal attachment.

In FIG. 9 a hydraulic schematic is provided in which foot pedals 60, 60', in loader 11 (not shown in FIG. 9) can be operated to direct hydraulic fluid respectively through fluid lines 61, 61' to connector 62, into fluid line 63 and to connector 64 and then into fluid lines 65 and 66 for flow into hydraulic cylinders 29, 29'. By depressing right foot pedal 60 which acts as a flow control mounted conveniently in the cab of loader 11, blades 35, 35' rotate to a closed position to cut tree roots, a tree trunk or the like. To open blades 35, 35', left foot pedal 60' is depressed, fluid is directed through hydraulic line 61', to connector 62, fluid line 63, connector 64 and into fluid lines 65, 66 which rotates blades 35, 35' to open. Hydraulic power is preferred, although other types of power could likewise be used such as pneumatic, electrical or mechanical but such are not preferred.

Figure 10:
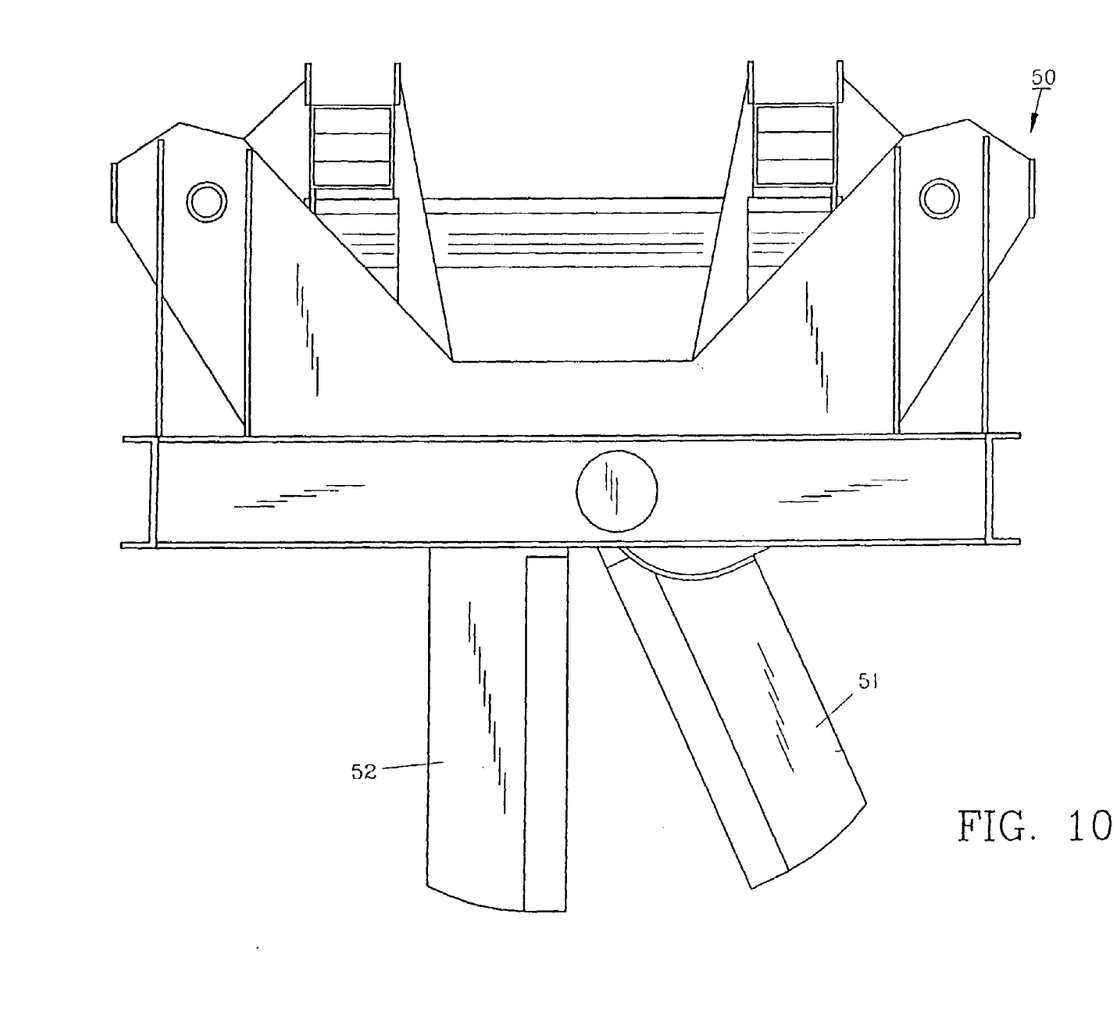
FIG. 10 demonstrates a front elevational view of another embodiment of the tree removal attachment of the invention.

In FIG. 10 a second or alternate embodiment of the invention is shown whereby tree removal attachment 50 has one moveable blade 51 and one stationary blade 52. Here, a hydraulic powered hydraulic cylinder (not shown) is required to power blade 51. Moveable blade 51 is pivotally mounted within tree removal attachment 50 in a similar manner as blade 35 of tree removal attachment 10 but may overlap stationary blade 52 in a scissor like manner for cutting and gripping trees and roots for effecting scissor like cutting and gripping of moveable blade 51 against stationary blade 52 is preferably supplied by one hydraulic cylinder (not shown) to reduce the overall weight of the tree removal attachment 50.

The preferred method of the invention utilizes tree removal attachment 10 having a pair of moveable blades 35, 35'. The method steps include affixing tree removal attachment 10 to loader 11 or other similar equipment, and connecting the hydraulic controls thereto. Next, loader 11 is driven to a desired location such as near the base of tree 71 as shown in FIG. 1. Next, booms 12, 12' are manipulated to direct blades 35, 35' while in a open position into ground 70 near roots 73 of tree 71. Blades 35, 35' are then closed and roots 73 can be cut below the surface of ground 70. Next, tree 71 can be pushed over easily by loader 11 with tree removal attachment 10 by manipulation of loader 11 and booms 12, 12'. Tree removal using this method does not create large ground holes which normally occur when bulldozing trees from a site or lot. Time and energy are saved as the holes created do not have to be back filled and packed.

The illustrations and examples provided herein are for explanatory purposes and are not intended to limit the scope of the appended claims.

I claim:

1. A tree removal attachment for construction equipment comprising: a frame, said frame comprising a rear section, a front section and a middle extension, said rear section rigidly joined to said middle extension, a mounting bracket, said mounting bracket pivotally joining said front section to said middle extension, said mounting bracket defining a plurality of apertures, said apertures for selectively positioning said front section relative to said rear section, a pair of scissor blades, said pair of blades attached to said front section, a hydraulic cylinder, said hydraulic cylinder attached to one of said pair of scissor blades to drive said scissor blade.

2. The tree removal attachment of claim 1 further comprising a V-plate, said V-plate attached to said front section, said V-plate defining a support aperture, a support rod, said support rod contained within said support aperture, said hydraulic cylinder pivotally mounted on said support rod.

3. A tree removal attachment for heavy construction equipment comprising: a frame, said frame having an inverted U-shape, said frame comprising a front section, a rear section and a middle extension, said rear section rigidly joined to said middle extension to prevent movement therebetween, said front section pivotally joined to said middle extension, said frame joined to the equipment, a movable first blade, said first blade affixed to said frame front section, a power supply, said power supply attached to said first blade for operating said first blade, a mounting bracket, said mounting bracket attached to said front section and said middle extension, said mounting bracket defining a plurality of apertures a locking pin, said locking pin inserted in one of said plurality of bracket apertures for locking said front section relative to said middle extension, whereby pivoting said front section will extend said first blade from the equipment.

4. The tree removal attachment of claim 3 further comprising a second blade, said second blade affixed to said frame front section proximate said first blade.

5. The tree removal attachment of claim 4 wherein said second blade is movable.

6. The tree removal attachment of claim 4 wherein said first blade and said second blade act as scissors.

7. The tree removal attachment of claim 3 wherein said power supply comprises a hydraulic system.

8. The tree removal attachment of claim 3 further comprising a power control, said power control joined to said power supply.

9. The tree removal attachment of claim 8 further comprising a hydraulic cylinder, said hydraulic cylinder connected to said power control.

* * * * *